United States Patent [19]
Rathert et al.

[11] Patent Number: 5,413,446
[45] Date of Patent: May 9, 1995

[54] BOOK COVER ASSEMBLY APPARATUS

[75] Inventors: Horst Rathert, Minden; Reimer Voss, Belm, both of Germany

[73] Assignee: Kolbus GmbH & Co. KG, Rahden, Germany

[21] Appl. No.: 162,536

[22] Filed: Dec. 3, 1993

[30] Foreign Application Priority Data

Dec. 9, 1992 [DE] Germany .......................... 42 41 387.7
Mar. 17, 1993 [DE] Germany .......................... 43 08 469.9

[51] Int. Cl.⁶ ................................................ B42C 7/00
[52] U.S. Cl. ............................................ 412/17; 412/3; 156/443
[58] Field of Search .................... 412/3, 17, 19, 22, 23; 53/228, 232, 580; 156/443

[56] References Cited

U.S. PATENT DOCUMENTS 2,501,733  3/1950  Merz ..................................... 412/17
2,556,787  6/1951  Bech et al. ........................ 412/17 X
4,889,461 12/1989 Kampen et al. ................. 412/17 X Primary Examiner—Tom Hughes
Attorney, Agent, or Firm—Chilton, Alix & Van Kirk

[57] ABSTRACT

A book cover formation machine has feeder stations for the cover cloth and cover boards, a glue-application station for the cover cloth, and an assembly station for mating the cover cloth and cover boards. The machine also has a turn-in station with turn-in elements for folding the head and foot flaps over the cover-board edges in a first plane, and for folding the lateral flaps over the cover-board edges in a vertically displaced second plane. The turn-in station is a separate mechanism juxtapositioned to the assembly station. The functions of assembling the cover cloth and boards, of executing the head and foot flap turn-ins, and of executing the lateral flap turn-ins, are coordinated such that all functions within a cycle are performed on different book covers simultaneously.

20 Claims, 4 Drawing Sheets

BOOK COVER ASSEMBLY APPARATUS

BACKGROUND OF THE INVENTION

The present invention relates generally to the manufacture of book covers and particularly to the folding of the head, foot and lateral side flaps of a cover. More specifically, this invention relates to methods and apparatus for book cover assembly.

Book covers consist of a covering material, two cover boards and a spine board positioned between the two cover boards. The boards are glued to the covering material over their entire area. The covering material that projects beyond the cover profile defined by the three boards is turned in on all four sides. In the industrial manufacture of book covers, these operations are accomplished by book cover assembly apparatus.

In a known book cover formation machine, each book cover is manufactured in a series of operations performed sequentially in a single continuously executed machine cycle. The cut-to-size covering material, or cover cloth, is separated from a stack in a magazine and fed to a glue roller via a cloth cylinder. A gripper bar acquires the glue-coated cover cloth and deposits it on a cover table. Feeder elements push the cut-to-size cover boards from magazines and into a ready-use supply station, simultaneously with the infeeding of a spine board that has been cut to length from a reel.

The two cover boards and the spine board are picked up by a suction head, which is associated with a double-headed suction arm, and after said suction arm has rotated through 180°, the boards are brought into contact with the glue-coated cloth which is lying on the cover table.

The cover table and suction arm thereafter move downwardly with the cover cloth and cover boards in two stages. On a first level, the projecting edges of the cover cloth on the so-called head and foot sides of the book cover are turned upwardly and then turned inwardly by means of a pair of turn-in rails. Additionally, the corners of the cover are drawn in by means of tools which are guided on side rails. The turning-up and turning-in, i.e., the folding, of the lateral cover flaps is performed on a second level, likewise by means of turn-in rails.

Simultaneously with the downward movement of the suction arm to the second level, a second suction head, mounted on the opposite side of the arm from the active head, acquires fresh cover boards that have been individually separated from the magazines, and the arm returns to its upper, starting position.

Finally, the cover table executes a downward movement, with the finished cover, to a third level. At the third level, a transport acquires the cover and feeds it to a pressing station, and the cover table likewise returns to its starting position in order to acquire the next cover cloth.

SUMMARY OF THE INVENTION

It is an object of this invention to a provide a method of and apparatus for the formation of high quality book covers substantially faster than has been previously possible while at the same time providing an apparatus characterized by a compact form of construction.

The objects of the invention are accomplished by distributing the assembly operations over several machine cycles such that all the operations within a cycle may be simultaneously performed on different book covers. Such a mode of operation increases the operating speed of the apparatus. Additionally, the transport distance between the folding station, at which the head and foot flaps are turned in, and the folding station, at which the lateral flaps are formed, are shortened, resulting in the availability of a relatively long pressing time for setting the glue. This leads to an increase in the quality of the book covers as regards to their having tighter flaps and firmer corners. The overall result of the time savings for the individual movement sequences results in an improvement in the smoothness of the running of the apparatus. The short transport distances result in a book cover assembly apparatus in accordance with the invention having a compact form of construction.

A book cover assembly apparatus in accordance with one embodiment of the present invention comprises a cover cloth feed station, a cover board ready-use supply station, a transport arm, an assembly station including a cover table, a turn-in station, a roll pressing station and a delivery conveyor.

The cover cloth feed station acquires the cloth, guides the cloth past an adhesive applicator and deposits the adhesive coated cloth on the cover table. The transport arm acquires the cover boards from the ready-use supply station and brings them into initial angular contact with the cover cloth. Descending movement of the transport arm, in synchronism with pivotal downward movement of the cover table, progressively diminishes the angle of contact, rolling the cloth into contact with the boards. The cover assembly is transported to the turn-in station which has turn-in elements disposed in vertically displaced planes for executing the head and foot flap turn-ins in a first plane and the lateral flap turn-ins in a second plane. The cover, with turned-in edges or flaps is subsequently fed to the pressing station. Covers exiting the pressing station are deposited onto a delivery conveyor.

The functions of assembling the cover cloths and boards, of executing the head and foot flap turn-ins, and of executing the lateral flap turn-ins, are coordinated one with another, such that all functions within a cycle are performed on different book covers simultaneously. Accordingly, a machine cycle is always available for each operation, including the transport movement.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several FIGURES and in which.

DESCRIPTION OF THE DISCLOSED EMBODIMENT

Figure 1:
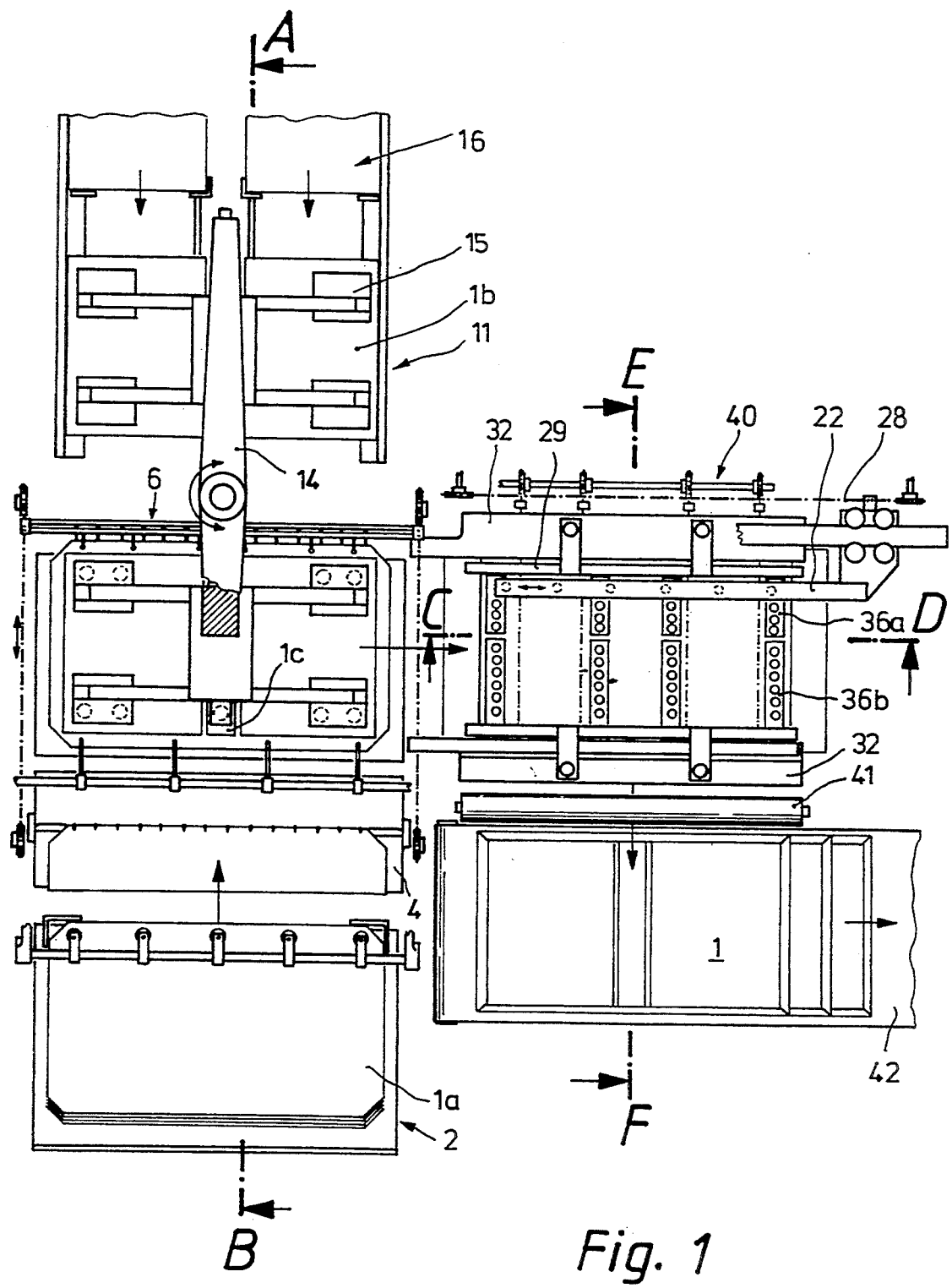
FIG. 1 is a schematic top plan view of apparatus in accordance with a first embodiment of the invention; taken along line A–B FIG. 1.
Figure 2:
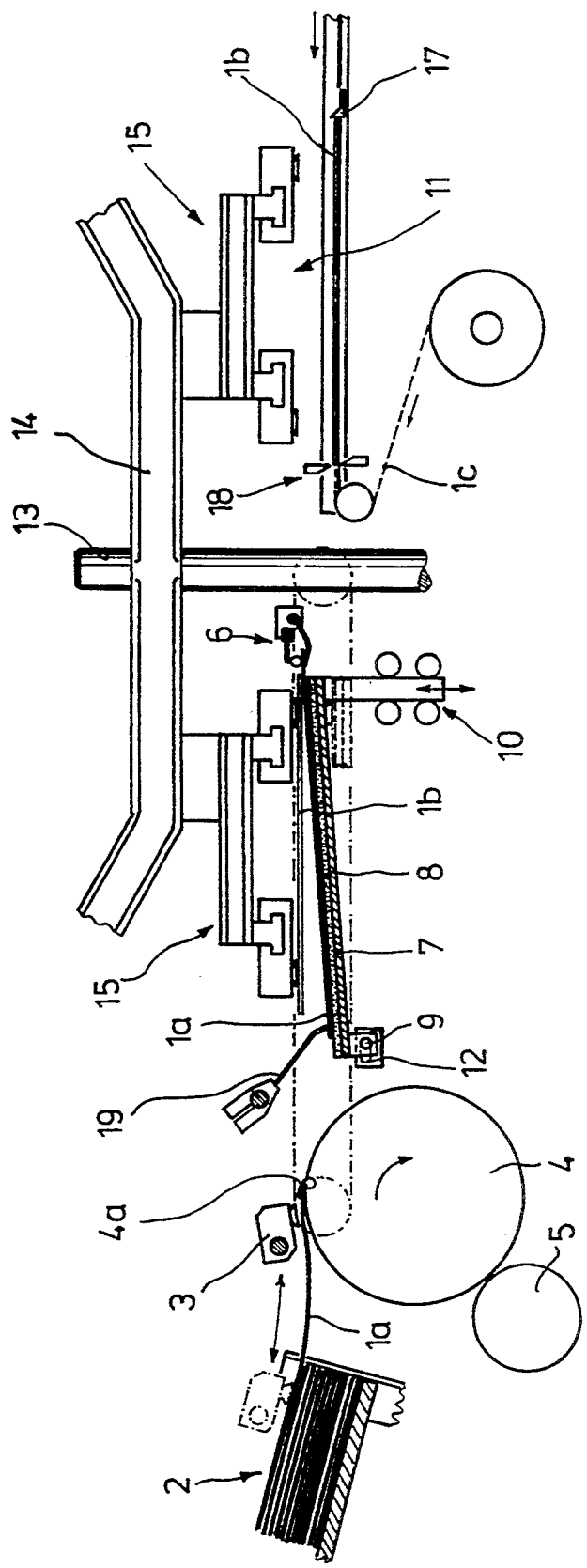
FIG. 2 is a gross-section view of the apparatus taken along line A–B of FIG. 1.
Figure 3:
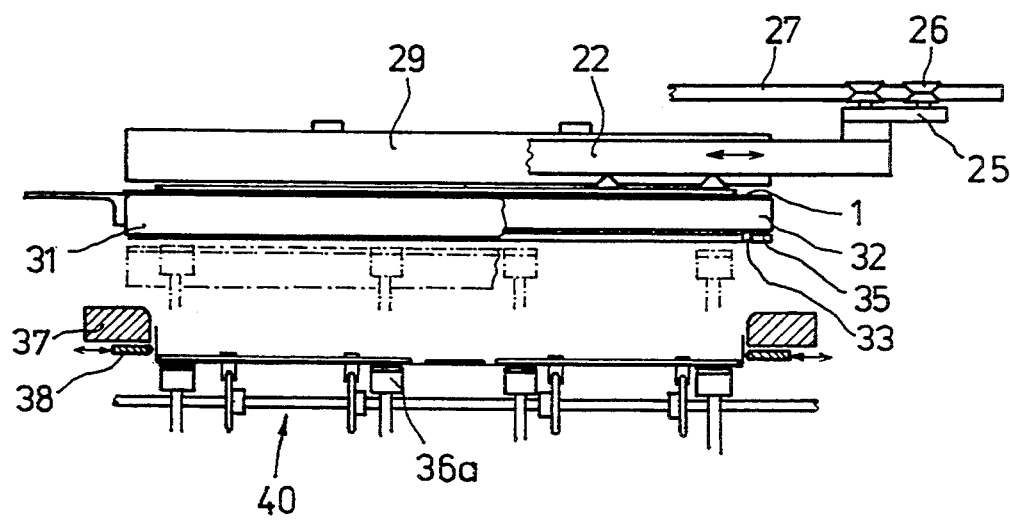
FIG. 3 is a cross-section view of the apparatus taken along line C–D of FIG. 1.
Figure 4:
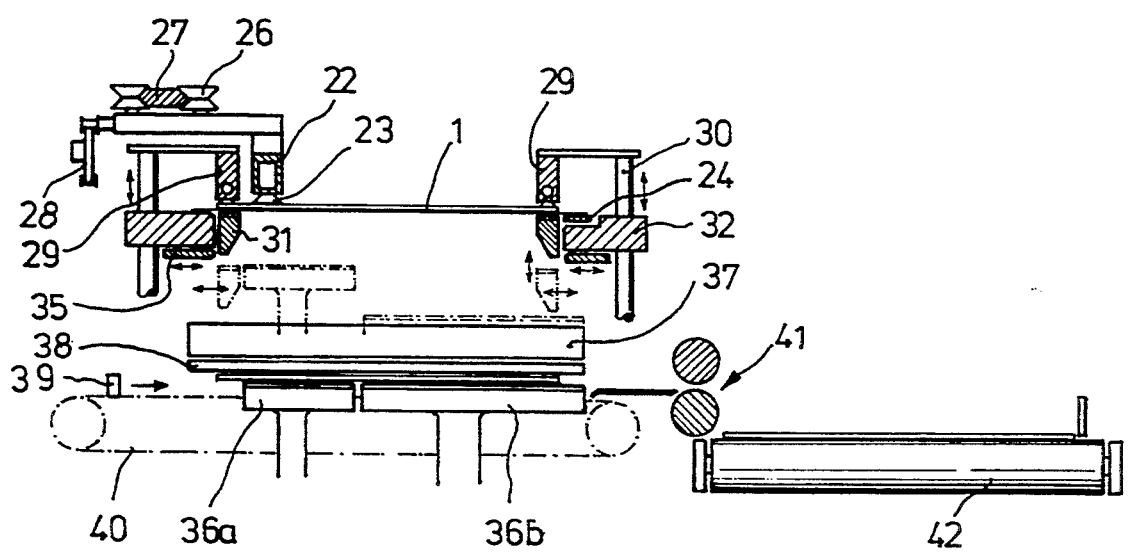
FIG. 4 is a cross- section view of the apparatus taken along line E–F FIG. 1.

Referring to FIGS. 1-4, the apparatus shown is intended for use in assembling book covers, such as indicated generally at 1 in FIGS. 1, 3 and 4, which are comprised of a covering material or cloth 1a adhesively secured to cover boards consisting of two side pieces 1b and a spine or center strip 1c.

The covering cloth 1a is withdrawn from a feeder-station magazine 2, in a known manner, by means of a pick-up device comprising a suction arm 3. The then withdrawn cover cloth is fed to an intermittently operated cloth cylinder 4 which, while at a standstill, acquires the cover cloth by means of grippers 4a. The cover cloth is next guided past a glue roller 5. After all-over application of glue, the glue-coated cloth 1a is acquired, while the cloth cylinder 4 is at a standstill, by a gripper bar 6. Gripper bar 6 is reciprocal in a straight line path. Gripper bar 6 deposits the coated cloth 1a on a cover table 7 at an assembly station. Immediately before the gripper bar 6 completes the forward transport of the cloth 1a onto the cover table 7, hold-down fingers 19 press said cloth 1a against said table 7 in the area of the foot turn-in flap, thus keeping the cloth taut.

Cover table 7 is coated with a facing layer 8 composed of a resilient material. Referring to FIG. 2, table 7 is mounted on an axle 9 which passes through elongated holes 12 in the machine frame. Accordingly, as shall be described below, table 7 may be pivoted between lower and upper movement limit positions. During this movement, table 7 is guided on its free side by means of a projecting member 10 which engages a roller track. Movement is imparted to projection 10 through the agency of drive means, not shown in the drawing. Parallel feeder elements 17, in the form of pushers, take the two cover boards 1b from magazines 16 on the side of table 7 opposite the cloth magazine 2, and convey the cover boards into a ready-use supply station 11. The spine strip 1c is simultaneously supplied from a supply reel and cut to length by means of a cutting mechanism 18.

A transport arm 14 is situated between the cover table 7 and supply station 11. The transport arm 14 is attached to a vertical shaft 13 and can be both rotated about a vertical axis and be moved up and down in a vertical plane. The transport arm 14 can thus be moved between the supply station 11 and the cover table 7 by being rotated. Arm 14 supports a suction plate assembly 15 which functions as a means of picking up the cover boards 1b, 1c and delivering the boards to cover table 7. As best shown in FIG. 2, table 7 is initially inclined, in an acquiring position, relative to the plane in which the incoming cover boards move during rotation of shaft 3. After the rotary movement has been completed, the transport arm 14 descends, and the boards 1b, 1c held by the suction plate assembly 15 are brought into contact with the cloth 1a. The initial contact is at the side corresponding to the head turn-in flap.

After the initial contact, the cover table 7 swings downwardly to the lower movement limit position in synchronism with the further descending movement of the transport arm 14. During this simultaneous motion, the angle included by the boards 1b, 1c and the cloth 1a which is lying on said cover table 7 progressively diminishes. The line of contact between the cover boards and cloth thus moves from the head side of the cover 1 and smoothly progresses to the foot side. In consequence of this progressive movement, the cloth 1a is rolled into contact with the boards 1b and 1c. The boards 1b and 1c are consequently fitted to the covering material 1a in a manner assuring precise registration. Because the cover cloth is stretched taut, as described above, the rolling action also avoids the entrapment of air that would form blisters.

According to the invention, a flap turn-in station is situated at some distance from the above-described station. The turn-in station depicted in cross-section in FIGS. 3 and 4, has turn-in elements which are disposed in vertically displaced planes. These turn-in elements execute the head and foot flap turn-ins in a first plane, and execute the lateral or side flap turn-ins in a second plane. Moreover, the functions of assembling the cover cloths 1a and boards 1b, of executing the head and foot flap turn-ins, and of executing the lateral flap turn-ins, are coordinated one with another such that all functions within a cycle are being performed on different book covers simultaneously. Accordingly, a machine cycle is available for each operation, including the transport movement.

The partially completed cover 1, comprising the assembly of the boards 1b, 1c and the cloth 1a, is gripped at one of its sides, along the entire length thereof, by a transport device in the form of a suction rail 22 having suction devices 23 positioned at intervals along the cover length. The purpose of this transport device is to supply the cover 1 to the turn-in station while keeping it flat. While the cover 1 is being thus transported, it is supported from underneath, at the side opposite the suction devices 23, by a supporting rail 24 which can be directed to move into and out of the movement path. The suction rail 22, with the suction devices 23, is supported on a carriage 25 having rollers 26 which engage a guide track 27. Carriage 25 is moved backwards and forwards by means of a drive system indicated schematically at 28 in FIGS. 1 and 4.

With the turn-in station is in its upper movement limit position, a pair of suction rails 29 acquire the incoming cover 1, in the plane in which it is supplied by the above-described transport device, gripping it in the areas near its sides. The suction rails 29 can be moved vertically on guide rods 30 in the direction indicated by arrows. After the supporting rail 24 has been retracted, by means of executing a small downward movement, suction rails 29 press the cover 1 against stationary pressure rails 31.

The downward movement of the cover continues to a position at which the upper surfaces of the cover boards 1b, 1c are located below a pair of turn-in rails 35. At this position the head and foot flaps have been turned upwardly. The turn-in rails 35 are now caused to move inwardly, in the direction indicated by arrows. The suction rails 29 then release their grip and move away from the cover. In order to achieve tight turn-ins of the flaps, the pressure rails 31 press the cover against the turn-in rails 35, which are still moving inwardly. Simultaneously with the turning-in operation, the corners of the cover cloth are drawn in by means of corner turn-in elements 33 which are guided by the turn-in rails 35. The pressure rails 31 next disengage from the cover 1 and move outwardly to clear the way for a further downward movement of the cover to the lateral flap turn-in station situated below.

In a modified design, the pressure rails 31 remain below the turn-in rails 35, and the suction rails 29 take over the vertical transport function.

In order to execute this further downward movement, the cover 1 is acquired, in the head and foot turn-in plane, by vertically movable first sections 36a of suction rails that are distributed over the cover length in a parallel arrangement. Suction rail sections 36a initially bring cover 1 onto an intermediate plane in which vertically movable second suction rail sections 36b acquire the cover so that it can be lowered, together with the first rail sections 36a, as far as the plane in which the lateral flap turn-ins are executed. The turning-up of the projecting lateral flaps of the cover 1, against stationary turn-up rails 37, is performed as the cover descends from the intermediate plane to the plane for the folding in of the lateral flaps.

The inward folding of the lateral flaps is performed, in a known manner, as a result of the inward movement of lateral turn-in rails 38, while at the same time the suction rails 36a, 36b exert a contact pressure.

After folding of the lateral flaps is completed, the suction rails 36a, 36b descend and deposit the cover 1 on a transport system 39, 40, so that a discharge chain 40 can, through the agency of feeder devices 39 associated therewith, release the finished cover 1 to a pair of downstream pressure rollers 41 and the cover then moves onto a delivery conveyor 42.

Figure 5A:
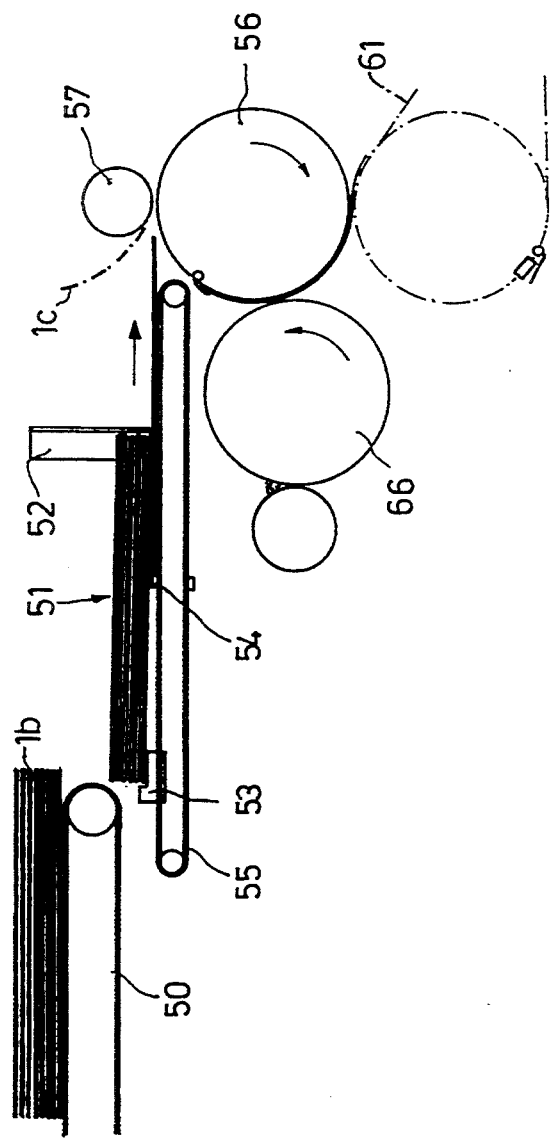
FIG. 5A and 5B are a schematic side view of a second embodiment of the invention.

In an alternative embodiment, referring to FIG. 5A, cover boards 1b are fed onto a board prestacking conveyor 50, and are automatically brought into a board magazine 51. The front edge of magazine 51 is adjustable and is formed by stops 52 which function as through-passage rails. In the board magazine 51, the boards 1b are individually separated from the stack by means of a short-stroke pusher 53 and are engaged by teeth 54 on belts 55. To assist this process, pusher 53 runs downwardly at a shallow angle. The return stroke of the pusher 53 is executed immediately, and this results in a board being unloaded from the stack. The engagement height of the teeth 54 is adjusted by vertical adjustments of guide rails, not shown in the drawing. The toothed belts 55 run continuously, at a speed corresponding to the machine cycle rate, and transfer the boards 1b, in a synchronized manner, to a cloth cylinder 56 which cooperates with an upper roller 57. In order to effect format height adjustment, the timing of the entire board-transport drive system is adjusted and the stops 52 are repositioned. A spine strip 1c will be cut to length and supplied in synchronism with the infeeding of the front and back cover boards, said spine strip being received from a pull-off arrangement not shown in the drawing.

Figure 5B:
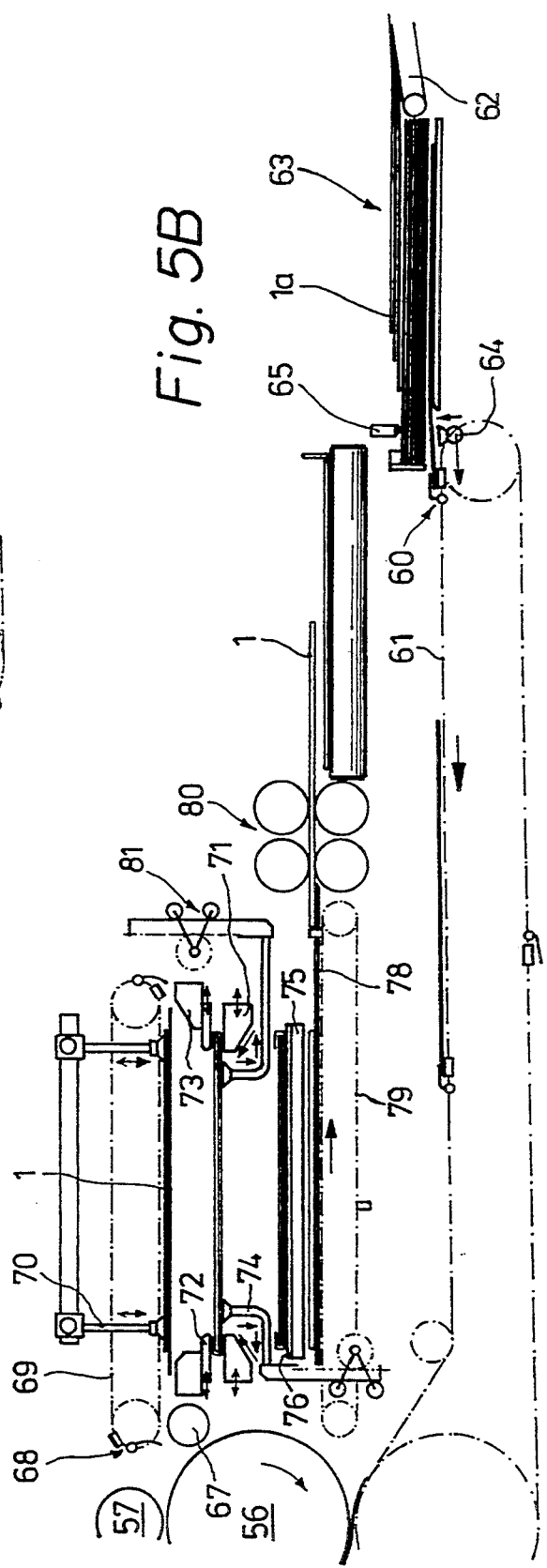

Referring to FIG. 5B, which depicts the portion of the alternative embodiment lying to the right of the hardware of FIG. 5A, the cover cloths 1a are supplied to cylinder 56 on the side opposite of magazine 51 from the side on which the boards 1b are supplied. In the disclosed implementation of the alternative embodiment, the cloths 1a are supplied directly to the cloth cylinder 56 by means of gripper bars 60 which are associated with a closed loop chain-type conveyor. Prior to engagement by the gripper bars, the cloths 1a are received on a prestacking conveyor 62 in, e.g., overlapping stream formation, and enter a cloth magazine 63. The cloths 1a are removed from magazine 63 by being tilted downwards by a rail 64 which is equipped with suction devices. Rails 64 transfer individual extracted cover cloths to a gripper bar 60 by executing a synchronized movement in the transport direction. The stack of cloths can be loosened by means of blowing air, so as to avoid roll effects. The infeeding of the cloths 1a, arriving in the overlapping stream formation, is controlled through the agency of optical sensors 65.

A first surface of each infed cloth is coated with glue by passage through a glue-application arrangement 66. The adhesive coated cloth is assembled with the cover boards 1b on the cloth cylinder 56 with the aid of the upper roller 57 to achieve the progressive mating as described above in the discussion of the embodiment of FIGS. 1–4. The cover assembly is thereafter acquired by grippers 68 positioned above support rollers 67. Grippers 68 are associated with a chain drive system 69 and deliver the cover assembly to a turn-in station. During this delivery the speed of said chain system 69 is reduced in a controlled manner. The book cover is held up by supporting rails, not shown in the drawing, so as to enable upper suction means 70 to acquire it at the turn-in station while the drive system 69 is at a standstill.

By executing a downward stroke, the suction means 70 bring the book cover into the head and foot turn-in plane, and deposit it on pressure rails 71 which have been deployed. The head and foot flaps are turned up, against stationary turn-up rails 73, during the downward movement.

Thereafter, the turn-in rails 72 execute the head and foot flaps turn-ins while the suction means 70 return upwards to their starting position. Concurrently with the execution of the head and foot flap turn-ins, the folding-in of the corners is performed by means of known corner turn-in elements.

Before the turning-in of the head and foot flaps is completed, lower suction means 74 move beneath the book covers. Upon completion of the head and foot flap formation, the suction means 74 acquire the cover and transport it, after retraction of the pressure rails 71 and turn-in rails 72, downwardly into the lateral flap turn-in plane. The book cover is deposited on laterally-situated suction rails 75 which, having been pushed forwards by this time, hold the cover by means of suction devices. The lateral flaps are now turned in by means of turn-in rails 76, i.e., a vertical movement results in the flaps being turned up, and a subsequent horizontal movement results in their being rubbed into contact with the boards. During the turn-in holding time, the suction means 74 move towards the head and foot of the book cover, and clear of the format area, so that the completed book cover can fall to the discharge plane after the suction rails 75 and turn-in rails 76 have been retracted.

The lower suction means 74 now move obliquely upwards to the acquiring position in the head and foot turn-in plane. At the same time, the finished book cover is forcibly accelerated downwards by deflectors on the suction means 74, so as to ensure that transport to the discharge plane does not depend on gravity, i.e., free fall. The book cover falls onto a supporting table 78, where it is pushed into the roll-pressing station 80 by means of a transport chain 79 which runs continuously at a speed corresponding to the machine cycle rate. The lower suction means 74 execute movements in the directions indicated by arrows, and can for this purpose be caused to execute vertical linear movements and horizontal swinging movements through the agency of drive arrangements 81. In the alternative embodiment of FIG. 5, all functions within a cycle are, according to the invention, performed on different book covers simultaneously. In other words, all operations on one book cover are performed in successive cycles.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An improved book cover assembly apparatus having feeder stations for a cover cloth having head, foot and lateral turn-in flap regions and for cover boards which define head, foot and lateral edges of a cover to be formed, the assembly apparatus also having a glue application station for the cover cloth, a cover table for receiving and uniting the cover cloth and cover boards, and a pressing station for pressing the cover cloth and cover boards, the improvement comprising:

a turn-in station substantially in alignment with the cover table, said turn-in station having turn-in elements for turning the head and foot flaps over the respective cover board head and foot edges in a first plane, turn-in elements for turning the lateral flaps over the cover board lateral edges in a second plane vertically displaced from said first plane, upper transport means for horizontally transporting the united cover cloth and cover boards from the cover table to said turn-in station, and lower transport means for vertically transporting the united cover cloth and cover boards between said first plane and said second plane; and means for transporting the united cover cloth and cover boards from said turn-in station to the pressing station.

2. The book cover assembly apparatus of claim 1 wherein the functions of uniting the cover cloths and cover boards, turning in the head and foot flaps, and turning in the lateral flaps are coordinated one with another such that all functions are performed on different book covers simultaneously.

3. The book cover assembly apparatus of claim 1 wherein said upper transport means has an acquiring function wherein said upper transport means grips the united cover cloth and cover boards to be transported to said turn-in station.

4. The book cover assembly apparatus of claim 3 wherein said lower transport means has an acquiring function wherein said lower transport means grips and vertically transports the united cover cloth and cover boards from the first turn-in plane to the vertically displaced second turn-in plane.

5. The book cover assembly apparatus of claim 4 wherein said lower transport means further comprises drive means wherein said drive means moves said lower transport in a vertical direction and in a horizontal direction.

6. The book cover assembly apparatus of claim 1 further comprising a transport arm wherein said transport arm transports the cover boards from the cover board feeder station to the cover table, said transport arm being rotatable about a vertical axis and vertically moveable.

7. The book cover assembly apparatus of claim 6 wherein the cover table further comprises a horizontal axle wherein the cover table may be pivoted from an upper angular position to a lower first horizontal position, wherein the cover table is pivoted to said upper angular position after receiving the cover cloth, wherein said transport arm positions the cover boards over the cover cloth in a second horizontal position whereby the cover boards contact the cover cloth on a horizontal contact line along the head edge, wherein the cover table pivots to said lower first horizontal position in synchronization with said transport arm moving to a lower third horizontal position whereby said horizontal contact line progressively moves towards the foot edge.

8. The book cover assembly apparatus of claim 1 wherein the cover table further comprises a facing layer composed of a resilient material.

9. The book cover assembly apparatus of claim 1 wherein said turn-in station further comprises turn-in rails and pressure rails, wherein said turn-in rails turn up and turn over the head and foot flaps and said pressure rails are vertically and horizontally moveable.

10. The book cover assembly apparatus of claim 9 wherein said upper transport means further comprises first suction rails, wherein said suction rails grip the united cover cloth and cover boards, wherein said first suction rails and said pressure rails may be vertically moved in synchronism from a plane on which the united cover cloth and cover boards are transported from the cover table to a plane wherein the united cover cloth and cover boards are below said turn-in rails.

11. The book cover assembly apparatus of claim 10 wherein said turn-in station further comprises second suction rails each composed of first and second sections, said second suction rails being parallel to the lateral edges, said second suction rail first sections being vertically moveable from said first plane to said second plane, said second suction rail second sections being vertically moveable from a plane intermediate said first and second planes to said second plane.

12. The book cover assembly apparatus of claim 1 wherein said turn-in station further comprises supporting rails, said supporting rails being horizontally movable, wherein the united cloth cover and cover boards are gripped along a longitudinal side by said upper transport means and is supported along an opposite longitudinal side by said supporting rails.

13. The book cover assembly apparatus of claim 1 further comprising hold-down fingers wherein said hold-down fingers press the cover cloth against the cover table in an area of the cover cloth foot flap upon receipt of the cover cloth.

14. The book cover assembly apparatus of claim 1 further comprising a cover cloth magazine, a cover board magazine, a conveying system and a cloth cylinder disposed adjacent said cover board magazine, said cover cloth magazine being disposed on one side of said apparatus and said cover board magazine being disposed on an opposite side, wherein said conveying system being disposed between said cover cloth magazine and said cloth cylinder for transporting cover cloths to said cloth cylinder.

15. The book cover assembly apparatus of claim 11 further comprising a transport arm wherein said transport arm transports the cover boards from the cover board feeder station to the cover table, said transport arm being rotatable about a vertical axis and vertically moveable.

16. The book cover assembly apparatus of claim 15 wherein the cover table further comprises a horizontal axle wherein the cover table may be pivoted from an upper angular position to a lower first horizontal position, wherein the cover table is pivoted to said upper angular position after receiving the cover cloth, wherein said transport arm positions the cover boards over the cover cloth in a second horizontal position whereby the cover boards contact the cover cloth on a horizontal contact line along the head edge, wherein the cover table pivots to said lower first horizontal position in synchronization with said transport arm moving to a lower third horizontal position whereby said horizontal contact line progressively moves towards the foot edge.

17. The book cover assembly apparatus of claim 16 wherein the cover table further comprises a facing layer composed of a resilient material.

18. The book cover assembly apparatus of claim 17 further comprising hold-down fingers wherein said hold-down fingers press the cover cloth against the cover table in an area of the cover cloth foot flap upon receipt of the cover cloth.

19. The book cover assembly apparatus of claim 18 wherein said upper transport means has an acquiring function wherein said upper transport means grips the united cover cloth and cover boards to be transported to said turn-in station.

20. The book cover assembly apparatus of claim 19 wherein said lower transport means has an acquiring function wherein said lower transport means grips and vertically transports the united cover cloth and cover boards from the first turn-in plane to the vertically displaced second turn-in plane.

* * * * *